(12) United States Patent
Niida et al.

(10) Patent No.: US 8,578,440 B2
(45) Date of Patent: Nov. 5, 2013

(54) VIDEO PROCESSING APPARATUS AND METHOD OF CONTROLLING VIDEO PROCESSING APPARATUS

(75) Inventors: Mitsuo Niida, Kanagawa (JP); Hajime Oshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1332 days.

(21) Appl. No.: 10/891,106

(22) Filed: Jul. 15, 2004

(65) Prior Publication Data
US 2004/0261133 A1    Dec. 23, 2004

Related U.S. Application Data

(63) Continuation of application No. PCT/JP2004/007128, filed on May 19, 2004.

(30) Foreign Application Priority Data

May 21, 2003  (JP) .................................. 2003-144189

(51) Int. Cl.
H04N 7/16         (2011.01)
(52) U.S. Cl.
USPC ........... 725/141; 725/133; 725/153; 370/389; 370/392; 370/474; 370/475; 370/476
(58) Field of Classification Search
USPC ................. 725/133, 141, 153, 54, 67–68; 375/240.26; 370/474–476, 389, 392
See application file for complete search history.

(56) References Cited

U.S. PATENT DOCUMENTS

| | | | | |
|---|---|---|---|---|
| 5,521,927 | A * | 5/1996 | Kim et al. | 370/474 |
| 6,600,787 | B2 * | 7/2003 | Tsuboi | 375/240.25 |
| 6,831,892 | B2 * | 12/2004 | Robinett et al. | 370/232 |
| 6,934,906 | B1 * | 8/2005 | Cheok | 715/204 |
| 7,219,238 | B2 * | 5/2007 | Saito et al. | 713/193 |
| 2001/0047441 | A1 * | 11/2001 | Robertson | 710/65 |
| 2002/0018580 | A1 * | 2/2002 | Maeda | 382/100 |

(Continued)

FOREIGN PATENT DOCUMENTS

WO    WO 02/080542    10/2002

OTHER PUBLICATIONS

Khaled Shuaib, Tarek Saadawi, Myung Lee, Bert Basch; "Dejittering in the transport of MPEG-2 and MPEG-4 video"; Multimedia Systems 8: 231-239 (2000). (http://www.springerlink.com/content/7dlt7qwcdtdbhflm/).*

(Continued)

Primary Examiner — Hunter B Lonsberry
Assistant Examiner — Alexander Q Huerta
(74) Attorney, Agent, or Firm — Fitzpatrick, Cella, Harper & Scinto

(57) ABSTRACT

A video processing apparatus includes a conversion unit and a transmission unit, and an external device includes a reception unit and a restoration unit. The conversion unit converts one or a plurality of elementary streams complying with ISO/IEC 14496-1:1999 into one data stream. The data stream includes a plurality of multiplexed packets, each multiplexed packet including both a Synchronization Layer (SL) packet and an elementary stream identifier of the SL packet. The transmission unit transmits the data stream to the external device using an isochronous or bulk transfer. The reception unit receives, from the external device, the data stream that is transmitted using the isochronous or bulk transfer. The restoration unit restores the data stream to one or a plurality of elementary streams complying with ISO/IEC 14496-1:1999.

35 Claims, 12 Drawing Sheets

(56) References Cited

U.S. PATENT DOCUMENTS

| | | | | |
|---|---|---|---|---|
| 2002/0118749 | A1* | 8/2002 | Gentric et al. | 375/240.08 |
| 2003/0021587 | A1* | 1/2003 | Sugimoto et al. | 386/95 |
| 2003/0041123 | A1* | 2/2003 | Sato et al. | 709/219 |
| 2003/0084451 | A1* | 5/2003 | Pierzga et al. | 725/47 |
| 2003/0149780 | A1* | 8/2003 | Inoue et al. | 709/229 |
| 2004/0022202 | A1* | 2/2004 | Yang et al. | 370/261 |
| 2004/0057457 | A1* | 3/2004 | Ahn et al. | 370/466 |
| 2004/0107356 | A1* | 6/2004 | Shamoon et al. | 713/193 |
| 2004/0114911 | A1 | 6/2004 | Ito | 386/111 |
| 2004/0240561 | A1* | 12/2004 | Crinon | 375/240.26 |
| 2007/0074269 | A1* | 3/2007 | Hua | 725/151 |

OTHER PUBLICATIONS

Alexandros Eleftheriadis, Carsten Herpel, Ganesh Rajan, Liam Ward; "Text for ISO/IEC FCD 14496-1 Systems"; MPEG-4 Systems (May 15, 1998). (http://www.itscj.ipsj.or.jp/sc29/open/29view/29n2601t.pdf).*

USB 2.0 Promoter Group, *Universal Serial Bus Specification Revision 2.0*, pp. 1-11 (Apr. 27, 2000).

Caprioglio, M. et al., "An End-to-End Architecture for Advanced Multimedia Broadcast" *2001 IEEE International Conference on Systems, Man and Cybernetics*, vol. 1, pp. 3217-3222, (Oct. 7, 2001).

ISO/IEC 14496-1:1999, "Information technology—Coding of audio visual objects—Part 1: Systems," pp. 1-281.

"Universal Serial Bus Specification Revision 2.0," Apr. 27, 2000, pp. 1-622.

Japanese Office Action issued Apr. 28, 2009, in Japanese Application No. 2003-144189.

Shinichi Sakaida, "The International Coding Standard MPEG-4 in Multimedia Era," NHK Science & Technology Research Laboratories News, No. 103, p. 9-17 & Fig. 5, and English-language translation thereof, Aug. 1998.

Japanese Office Action dated Aug. 25, 2009, in Japanese Application No. 2003-144189, and English-language translation thereof.

* cited by examiner

FIG. 11

| Offset | Field | Size | Value | Description |
|---|---|---|---|---|
| 0 | bLength | 1 | Number | DATA LENGTH OF THIS FormatDescriptor |
| 1 | bDescriptorType | 1 | Constant | STORE VALUE USED TO IDENTIFY TYPE OF THIS descriptor |
| 2 | bDescriptorSubType | 1 | Constant | STORE VALUE USED TO IDENTIFY SUB-TYPE OF THIS descriptor |
| 3 | bFormatIndex | 1 | Number | INDEX NUMBER OF THIS FormatDescriptor |
| 4 | bInitialObjectDescriptorLength | 1 | Number | DATA LENGTH d OF bInitialObjectDescriptor IF NO DATA OF bInitialObjectDescriptor IS SENT, 0 MUST BE SET. |
| 5 | bInitialObjectDescriptor | d | Number | INSTANCE DATA OF INITIAL OBJECT DESCRIPTOR NORMALLY, INITIAL OBJECT DESCRIPTOR IS TRANSFERRED ONLY ONCE AT TIMING WHEN MPEG-4SL Payload Format IS SELECTED AND INITIALIZATION IS DONE. WHEN INITIAL OBJECT DESCRIPTOR IS TRANSFERRED AGAIN AFTER COMPLETION OF INITIALIZATION, RECEIVING SIDE EXECUTES INITIALIZATION AGAIN ACCORDING TO CONTENTS OF TRANSFERRED INITIAL OBJECT DESCRIPTOR. DATA OF INITIAL OBJECT DESCRIPTOR NEED NOT PACKED IN SL PACKET OR Mux PACKET. THIS FIELD IS OPTION, AND MAY BE OMITTED IF IT IS NOT REQUIRED. |
| 5+d | bNumPackets | 1 | Number | NUMBER OF Mux PACKETS TO BE SENT BY DESCRIPTOR: n. THIS NUMBER IS HANDLED AS NUMBER OF ELEMENTS OF SEQUENCE HAVING PAIRS OF SUBSEQUENT bPacketLength and bPacket AS ELEMENTS. WHEN THERE IS NO PACKET TO BE SENT BY DESCRIPTOR, 0 IS SET. |
| 6+d | bPacketLength(1) | 1 | Number | DATA LENGTH OF bPackets(1): p(1) |
| 6+d+1 | bPacket(1) | p(1) | Number | DATA OF FIRST Mux PACKET TO BE SENT |
| 6+d+1+p(1) | bPacketLength(2) | 1 | Number | DATA LENGTH OF bPackets(2): p(2) |
| 6+d+2+p(1) | bPacket(2) | p(2) | Number | DATA OF SECOND Mux PACKET TO BE SENT |
| 6+d+(n−1)+p(1)+...+p(n−1) | bPacketLength(n) | 1 | Number | DATA LENGTH OF bPackets(n): p(n) |
| 7+d+n+p(1)+...+p(n−1) | bPacket(n) | p(n) | Number | DATA OF n-TH Mux PACKET TO BE SENT |

FIG. 12

| Control Selector | VS_STREAM_ERROR_CODE_CONTROL | | | |
|---|---|---|---|---|
| wLength | 1 | | | |
| Offset | Field | Size | Value | Description |
| 0 | bStreamErrorCode | 1 | Number | INDICATE ERROR CONTENTS; DEFINITIONS OF RESPECTIVE VALUES ARE AS FOLLOWS:<br><br>0: No Error: INDICATE NO ERROR<br><br>1: Protected content: INDICATE THAT DATA SOURCE DEVICE DETECTS PROTECTED STREAM, AND CANNOT TRANSFER THAT STREAM. DURING TRANSFER OF PROTECTED STREAM, EMPTY PACKET CONTAINING STREAM HEADER ALONE IS TRANSMITTED.<br><br>2: Input buffer under-run: INDICATE THAT DATA SOURCE DEVICE CANNOT SUPPLY DATA AT REQUESTED DATA RATE, AND DURING BUFFER UNDER-RUN, EMPTY PACKET CONTAINING STREAM HEADER ALONE IS TRANSMITTED.<br><br>3: Data discontinuity: INDICATE OCCURRENCE OF DATA DISCONTINUITY (DUE TO INFERIOR MEDIA, ENCODER ERROR, ETC.).<br><br>4: Output buffer under-run: INDICATE THAT DATA SINK DEVICE IS NOT SUPPLIED WITH DATA AT SUFFICIENT RATE.<br><br>5: Output buffer overrun: INDICATE THAT DATA SINK DEVICE IS SUPPLIED WITH DATA AT RATE BEYOND RATE THAT ALLOWS BUFFERING.<br><br>6: Format change: INDICATE THAT dynamic format change event HAS OCCURRED. BASED ON THAT EVENT, HOST MAY RE-ACQUIRE Descriptor USING GetDescriptor COMMAND.<br><br>7: Still image capture error: INDICATE THAT DEVICE HAS OCCURRED ERROR UPON CAPTURING STILL IMAGE.<br><br>8: Unknown: INDICATE UNKNOWN ERROR. |

VIDEO PROCESSING APPARATUS AND METHOD OF CONTROLLING VIDEO PROCESSING APPARATUS

This application is a continuation of PCT/JP2004/00718 filed May 19, 2004, in the English language, in the Receiving Office of the Japanese Patent Office.

TECHNICAL FIELD

The present invention relates to a video processing apparatus, which handles an elementary stream and, especially, one or a plurality of elementary streams complying with ISO/IEC 14496-1:1999, and the like.

BACKGROUND ART

In recent years, as one of the communication interfaces used to connect a host (personal computer or the like) and a peripheral device (including a video processing apparatus such as a digital video camera or the like), USB 2.0 (see Universal Serial Bus Specification Revision 2.0, Apr. 27, 2000) is known.

Also, in recent years, as one of the visual and audio object encoding methods, an encoding method called MPEG-4 has received a lot of attention (e.g., see ISO/IEC 14496-1:1999, Information technology—Coding of audio-visual objects—Part 1: Systems, ISO/IEC 14496-2:1999, Information technology—Coding of audio-visual objects—Part 2: Visual and ISO/IEC 14496-3:1999, Information technology—Coding of audio-visual objects—Part 3: Audio).

However, there is no conventional video processing apparatus (especially, a digital video camera) which can transmit one or a plurality of elementary streams complying with MPEG-4 (ISO/IEC 14496-1:1999) to another apparatus (host or the like) using an Isochronous Transfer or a Bulk Transfer specified by USB 2.0. Furthermore, there is no conventional video processing apparatus which can receive one or a plurality of elementary streams complying with MPEG-4 (ISO/IEC 14496-1:1999) from another apparatus (host or the like) using an Isochronous Transfer or a Bulk Transfer specified by USB 2.0.

DISCLOSURE OF INVENTION

The present invention has been made to solve such problems, and has as its principal object to provide an apparatus and method, which can transmit one or a plurality of elementary streams complying with ISO/IEC 14496-1:1999 to another apparatus (host or the like) using an Isochronous Transfer or a Bulk Transfer specified by USB 2.0.

It is another principal object of the present invention to provide an apparatus and method, which can receive one or a plurality of elementary streams complying with ISO/IEC 14496-1:1999 from another apparatus (host or the like) using an Isochronous Transfer or a Bulk Transfer specified by USB 2.0.

According to an aspect of the present invention, there is provided a video processing apparatus comprising: conversion means for converting one or a plurality of elementary streams complying with ISO/IEC 14496-1:1999 into one data stream; and transmission means for transmitting the data stream to another apparatus using an isochronous transfer complying with USB 2.0.

According to another aspect of the present invention, there is provided a communication method of a video processing apparatus, comprising: converting one or a plurality of elementary streams complying with ISO/IEC 14496-1:1999 into one data stream; and transmitting the data stream to another apparatus using an isochronous transfer complying with USB 2.0.

According to further aspect of the present invention, there is provided a video processing apparatus comprising: conversion means for converting one or a plurality of elementary streams complying with ISO/IEC 14496-1:1999 into one data stream; and transmission means for transmitting the data stream to another apparatus using a bulk transfer complying with USB 2.0.

According to yet further aspect of the present invention, there is provided a communication method of a video processing apparatus, comprising: converting one or a plurality of elementary streams complying with ISO/IEC 14496-1: 1999 into one data stream; and transmitting the data stream to another apparatus using a bulk transfer complying with USB 2.0.

According to another aspect of the present invention, there is provided a video processing apparatus comprising: reception means for receiving one data stream transmitted from another apparatus using an isochronous transfer complying with USB 2.0; and restoration means for restoring the data stream to one or a plurality of elementary streams complying with ISO/IEC 14496-1:1999.

According to still further aspect of the present invention, there is provided a communication method of a video processing apparatus, comprising: receiving one data stream transmitted from another apparatus using an isochronous transfer complying with USB 2.0; and restoring the data stream to one or a plurality of elementary streams complying with ISO/IEC 14496-1:1999.

According to further aspect of the present invention, there is provided a video processing apparatus comprising: reception means for receiving one data stream transmitted from another apparatus using a bulk transfer complying with USB 2.0; and restoration means for restoring the data stream to one or a plurality of elementary streams complying with ISO/IEC 14496-1:1999.

According to another aspect of the present invention, there is provided a communication method of a video processing apparatus, comprising: receiving one data stream transmitted from another apparatus using a bulk transfer complying with USB 2.0; and restoring the data stream to one or a plurality of elementary streams complying with ISO/IEC 14496-1:1999.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 11 is a view for explaining the format of an MPEG-4 SL Stream Format Descriptor; and FIG. 12 is a view for explaining the structure of a stream error code control data.

BEST MODE FOR CARRYING OUT THE INVENTION

Preferred embodiments of the present invention will now be described in detail in accordance with the accompanying drawings.

First Embodiment

Figure 1:
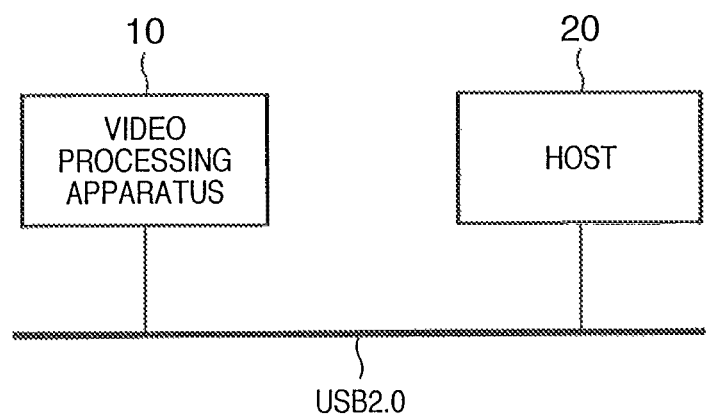
FIG. 1 is a block diagram showing principal building components of a communication system according to the first embodiment.

Principal building components of a communication system in the first embodiment will be described first with reference to FIG. 1. A video processing apparatus 10 and a host 20 are apparatuses which can handle one or a plurality of elementary streams complying with ISO/IEC 14496-1:1999. For example, these apparatuses can handle elementary streams of visual objects complying with ISO/IEC 14496-2:1999, audio objects complying with ISO/IEC 14496-3:1999, and a scene description complying with ISO/IEC 14496-1:1999. The video processing apparatus 10 comprises, e.g., a digital video camera, and the host 20 comprises, e.g., a personal computer. Note that the video processing apparatus 10 is not limited to a digital video camera, but may comprise a digital video recorder, a portable phone with a camera function, and the like.

The video processing apparatus 10 and the host 20 can communicate with each other using digital interface units complying with the USB 2.0 standard. The video processing apparatus 10 is an apparatus having a function of a "device" defined by USB 2.0, and the host 20 is an apparatus having a function of a "host" defined by USB 2.0.

The video processing apparatus 10 has a function of converting one or a plurality of elementary streams complying with ISO/IEC 14496-1:1999 into an MPEG-4 SL (Synchronization Layer) stream (a single data stream which is uniquely defined by the first embodiment), and a function of transmitting that MPEG-4 SL stream to the host 20 using an Isochronous Transfer or a Bulk Transfer of USB 2.0. Furthermore, the video processing apparatus 10 has a function of receiving an MPEG-4 SL stream transmitted from the host 20 using an Isochronous Transfer or a Bulk Transfer of USB 2.0, and a function of restoring the received MPEG-4 SL stream to one or a plurality of elementary streams. The host 20 also has these functions as in the video processing apparatus 10.

Figure 2:
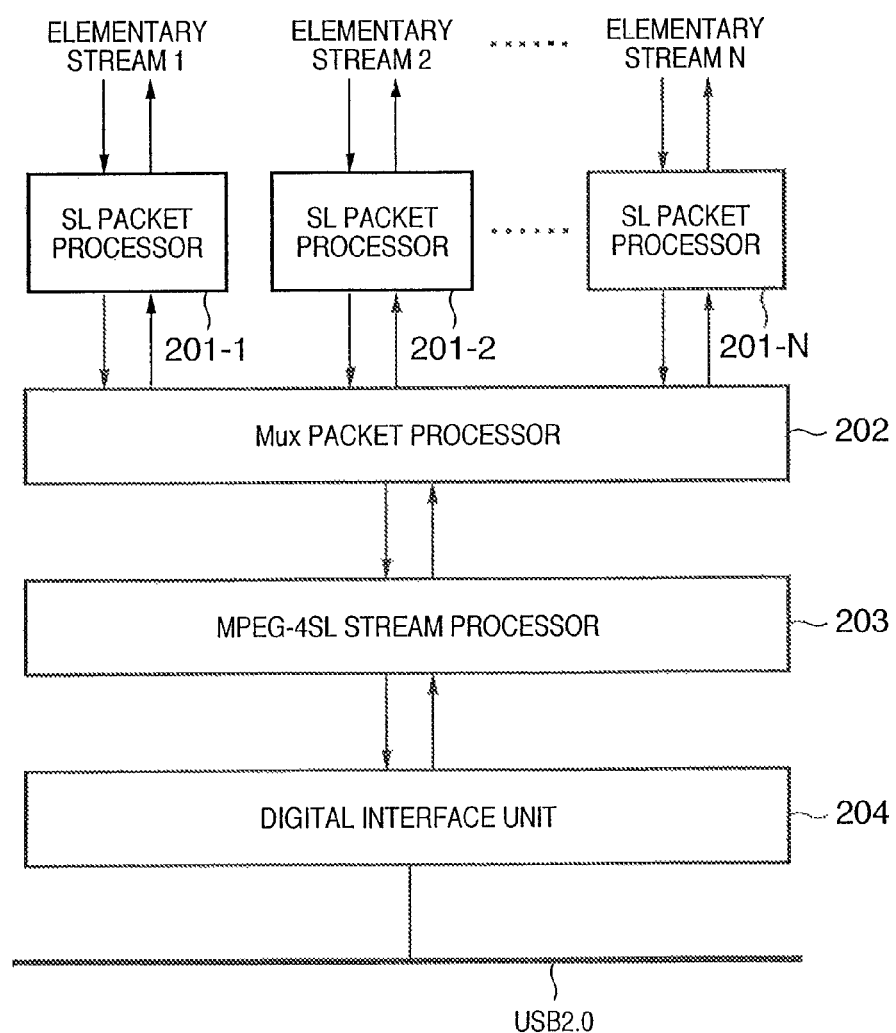
FIG. 2 is a block diagram showing building components of a video processing apparatus 10 and a host 20.

Building components of the video processing apparatus 10 and the host 20 will be described below with reference to FIG. 2. Each of SL packet processors 201-1 to 201-N executes a process for generating a plurality of SL (Synchronization Layer) packets from each of elementary streams 1 to N, and its reverse process. An Mux packet processor 202 executes a process for generating one Mux packet from respective SL packets, and its reverse process. An MPEG-4 SL stream processor 203 executes a process for generating one MPEG-4 SL stream by multiplexing a plurality of Mux packets, and its reverse process. The MPEG-4 SL stream processor 203 also generates and interprets a stream header to be described later. A digital interface unit 204 complies with USB 2.0, and transmits or receives an MPEG-4 SL stream according to the sequences shown in FIGS. 6 to 9.

Figure 3:
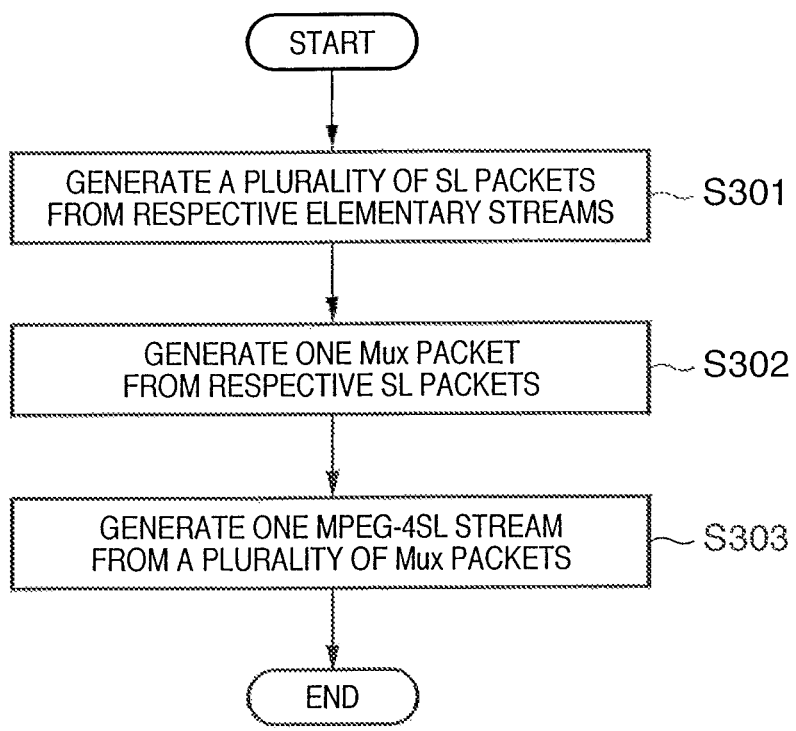
FIG. 3 is a flowchart for explaining a sequence for converting one or a plurality of elementary streams complying with ISO/IEC 14496-1:1999 into an MPEG-4 SL stream.

The processing sequence of the function of converting one or a plurality of elementary streams complying with ISO/IEC 14496-1:1999 into one MPEG-4 SL stream will be described below with reference to FIG. 3.

Step S301: Each of the SL packet processors 201-1 to 201-N generates a plurality of SL (Synchronization Layer) packets from each of elementary streams 1 to N, and supplies the plurality of generated SL packets to the Mux packet processor 202. Since the format of each SL packet is defined by ISO/IEC 14496-1:1999, a detailed description thereof will be omitted.

Step S302: The Mux packet processor 202 generates one Mux packet from respective SL packets, and supplies the generated Mux packet to the MPEG-4 SL stream processor 203. The Mux packet is different from a FlexMux packet defined by ISO/IEC 14496-1:1999, and is uniquely defined by the first embodiment. The format of the Mux packet will be described later (see FIG. 5).

Step S303: The MPEG-4 SL stream processor 203 generates one MPEG-4 SL stream by multiplexing a plurality of Mux packets.

In this way, the video processing apparatus 10 and the host 20 can convert one or a plurality of elementary streams complying with ISO/IEC 14496-1:1999 into an MPEG-4 SL stream as a single data stream. In other words, these apparatuses can multiplex one or a plurality of elementary streams complying with ISO/IEC 14496-1:1999 to an MPEG-4 SL stream as a single data stream. Also, since the video processing apparatus 10 and the host 20 can convert one or a plurality of elementary streams (complying with ISO/IEC 14496-1:1999) into one MPEG-4 SL stream, they can output one or a plurality of elementary streams from one end point (Isochronous end point or Bulk end point).

Figure 4:
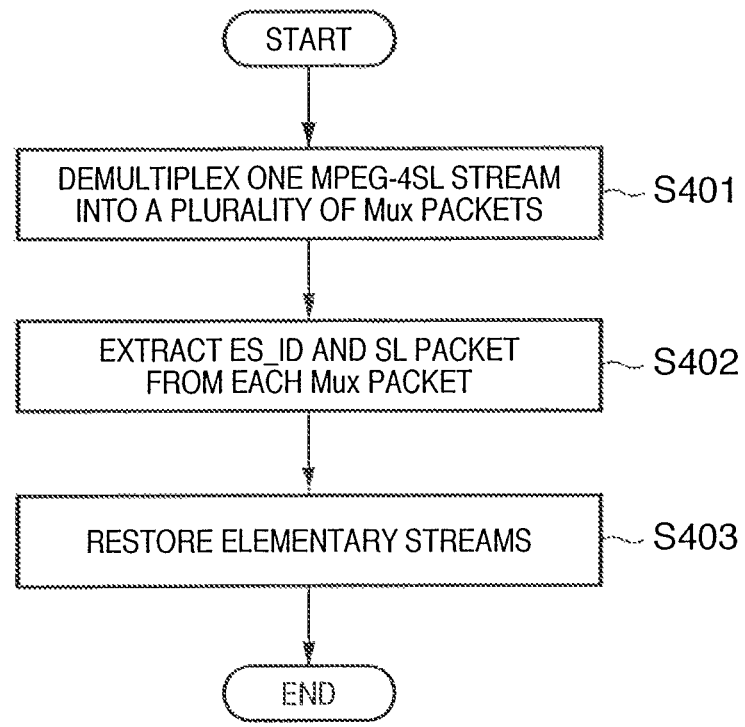
FIG. 4 is a flowchart for explaining a sequence for restoring an MPEG-4 SL stream to one or a plurality of elementary streams complying with ISO/IEC 14496-1:1999.

The processing sequence of the function of restoring one MPEG-4 SL stream to one or a plurality of elementary streams complying with ISO/IEC 14496-1:1999 will be described below with reference to FIG. 4.

Step S401: The MPEG-4 SL stream processor 203 demultiplexes one MPEG-4 SL stream into a plurality of Mux packets, and supplies these Mux packets to the Mux packet processor 202.

Step S402: The Mux packet processor 202 extracts ES_ID data and SL packets from the respective Mux packets, and identifies an elementary stream to which SL packets belong using the ES_ID data. The Mux packet processor 202 supplies the SL packets to one of the SL packet processors 201-1 to 201-N. The ES_ID data will be described later (see FIG. 5).

Step S403: Each of the SL packet processors 201-1 to 201-N reclaims each of elementary streams 1 to N from a plurality of SL packets obtained from the Mux packet processor 202.

In this way, the video processing apparatus 10 and host 20 can restore one MPEG-4 SL stream to one or a plurality of elementary streams. Since the video processing apparatus 10 and host 20 can restore one MPEG-4 SL stream to one or a plurality of elementary streams, they can input one or a plurality of elementary streams from one end point (an Isochronous end point or a Bulk end point).

Figure 5:
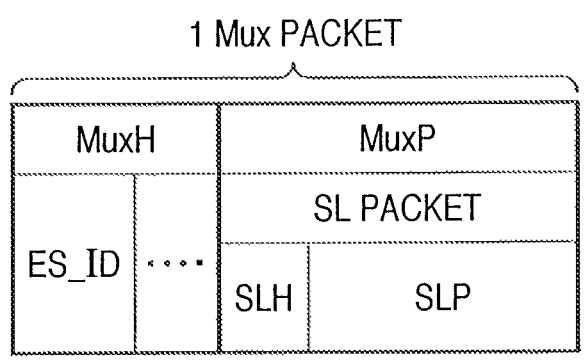
FIG. 5 is a view for explaining the format of an Mux packet.

The format of a Mux packet generated by the Mux packet processor in this embodiment will be described below with reference to FIG. 5. Referring to FIG. 5, MuxH is the header of a Mux packet, and MuxP is the payload of the Mux packet. MuxH includes additional information such as an ES_ID (Elementary Stream Identifier) data and the like. The ES_ID is an identifier used to identify an elementary stream to which an SL packet in the MuxP belongs, and is the same as ES_ID defined by ISO/IEC 14496-1:1999. In MuxP, SLH is the header of an SL packet, and SLP is the payload of the SL packet. In the first embodiment, one Mux packet is generated from only one SL packet. Also, in the first embodiment, even when an Mux packet is generated from only one elementary stream (i.e., even when an MPEG-4 SL stream is generated from only one elementary stream), the ES_ID is not omitted. Since each Mux packet includes ES_ID data, SL packets obtained from a plurality of elementary streams can be multiplexed and restored.

The stream format (MPEG-4 SL stream format) upon transmitting an Mux packet in various transfer modes of USB 2.0 will be described in detail below with reference to FIGS. 6 to 9.

Figure 6:
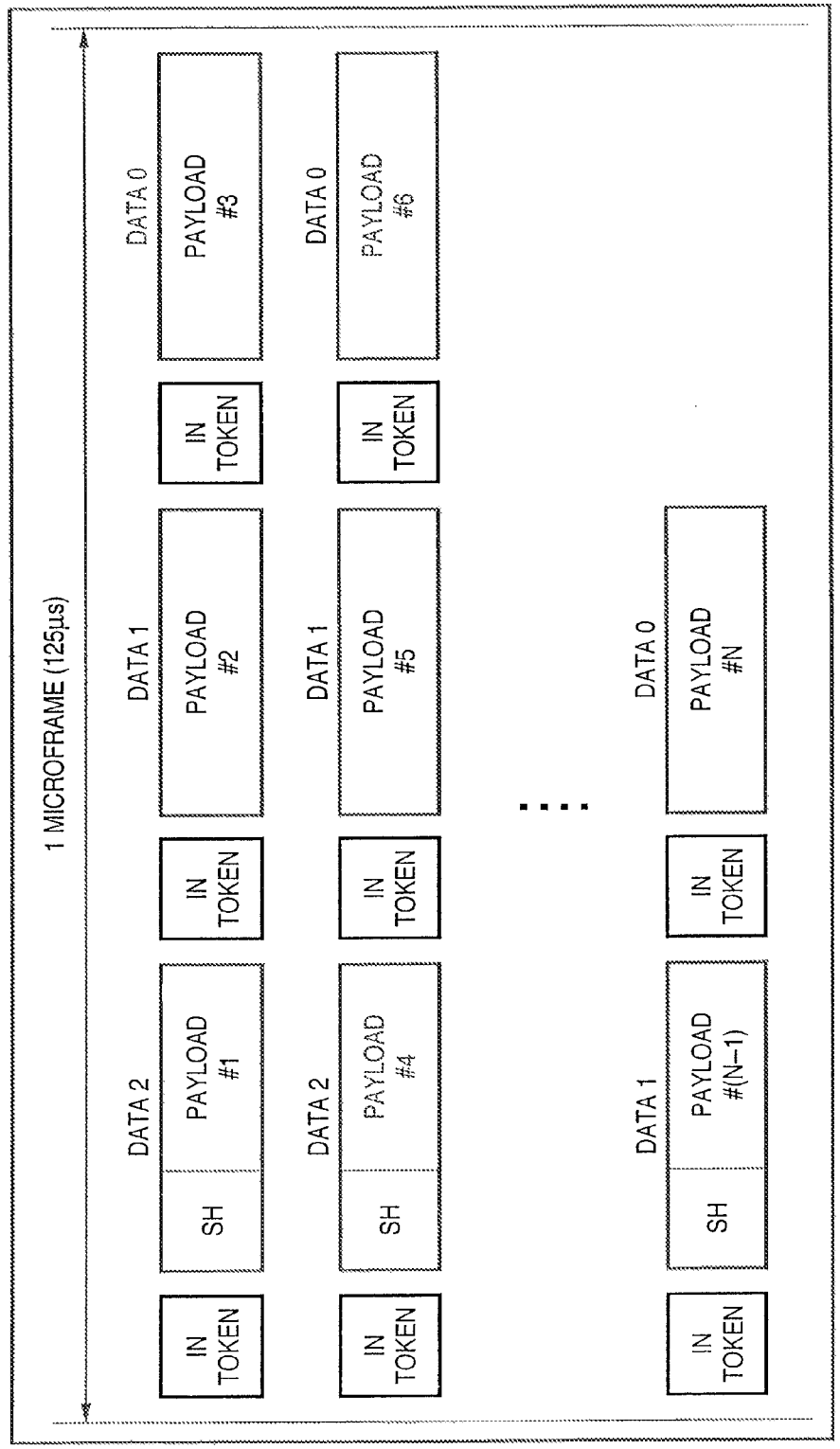
FIG. 6 is a chart for explaining an example of a sequence for transferring an MPEG-4 SL stream using an Isochronous IN Transaction of USB 2.0.

An example of the MPEG-4 SL stream format and sequence upon transferring the Mux packet using an Isochronous IN Transaction of USB 2.0 will be described first with reference to FIG. 6. When an Isochronous IN Transaction is used, the transmission direction of an MPEG-4 SL stream is a direction from the video processing apparatus 10 to the host 20. FIG. 6 will explain an example using High-speed mode of USB 2.0.

Referring to FIG. 6, an IN token is a transmission request packet of DATA2, DATA1, or DATA0 from the video processing apparatus 10 to the host 20. DATA2, DATA1, and DATA0 are data packets to be transferred from the video processing apparatus 10 to the host 20 in an Isochronous Transfer mode. SH (stream header) is a header which is transmitted every microframe (125 micro-seconds), and payloads #1 to #N (N is an integer equal to or larger than 2) are data obtained from one Mux packet. That is, one Mux packet is formed of payloads #1 to #N.

The MPEG-4 SL stream with the format shown in FIG. 6 is generated for each Mux Packet, and is transmitted in turn. By repeating this process, the video processing apparatus 10 can transmit the MPEG-4 SL stream to the host 20. In the first embodiment, in order to identify switching of Mux packets based on the stream header (SH), data obtained from a plurality of Mux packets are prevented from being mixed in one microframe. That is, the video processing apparatus 10 starts transmission of the next Mux packet from the next microframe.

In this manner, according to the first embodiment, an MPEG-4 SL stream generated from an Mux packet can be transmitted using an Isochronous IN Transaction of USB 2.0. In other words, one or a plurality of elementary streams complying with ISO/IEC 14496-1:1999 can be transmitted from the video processing apparatus 10 to the host 20 using an Isochronous Transfer of USB 2.0.

Figure 7:
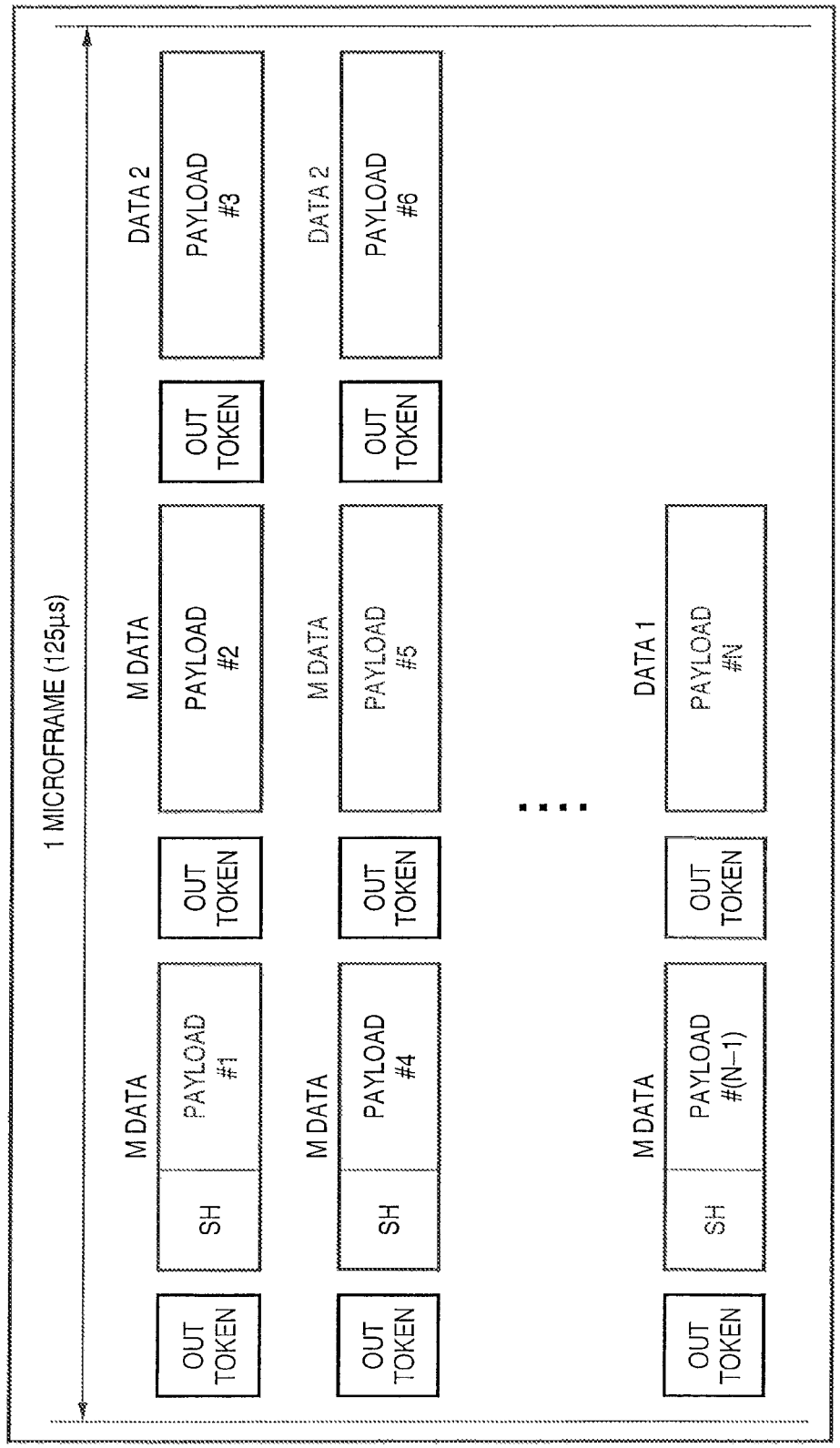
FIG. 7 is a chart for explaining an example of a sequence for transferring an MPEG-4 SL stream using an Isochronous OUT Transaction of USB 2.0.

An example of the MPEG-4 SL stream format and sequence upon transferring the aforementioned Mux packet using an Isochronous OUT Transaction of USB 2.0 will be described below with reference to FIG. 7. When Isochronous OUT Transaction is used, the transmission direction of an MPEG-4 SL stream is a direction from the host 20 to the video processing apparatus 10. FIG. 7 will explain an example using High-speed mode of USB 2.0.

Referring to FIG. 7, an OUT token is a transmission request packet of MDATA, DATA2, or DATA1 from the host 20 to the video processing apparatus 10. MDATA, DATA2, and DATA1 are data packets to be transferred from the host 20 to the video processing apparatus 10 in an Isochronous Transfer mode. SH (stream header) is a header which is transmitted every microframe (125 micro-seconds), and payloads #1 to #N (N is an integer equal to or larger than 2) are data obtained from one Mux packet. That is, one Mux packet is made up of payloads #1 to #N.

The MPEG-4 SL stream with the format shown in FIG. 7 is generated for each Mux Packet, and is transmitted in turn. By repeating this process, the host 20 can transmit the MPEG-4 SL stream to the video processing apparatus 10. In the first embodiment, in order to identify switching of Mux packets based on the stream header (SH), data obtained from a plurality of Mux packets are prevented from being mixed in one microframe. That is, the host 20 starts transmission of the next Mux packet from the next microframe.

In this manner, according to the communication system of the first embodiment, an Mux packet can be transmitted in the MPEG-4 SL stream format using Isochronous OUT Transaction of USB 2.0. In other words, one or a plurality of elementary streams complying with ISO/IEC 14496-1:1999 can be transmitted from the host 20 to the video processing apparatus 10 using Isochronous Transfer of USB 2.0.

Figure 8:
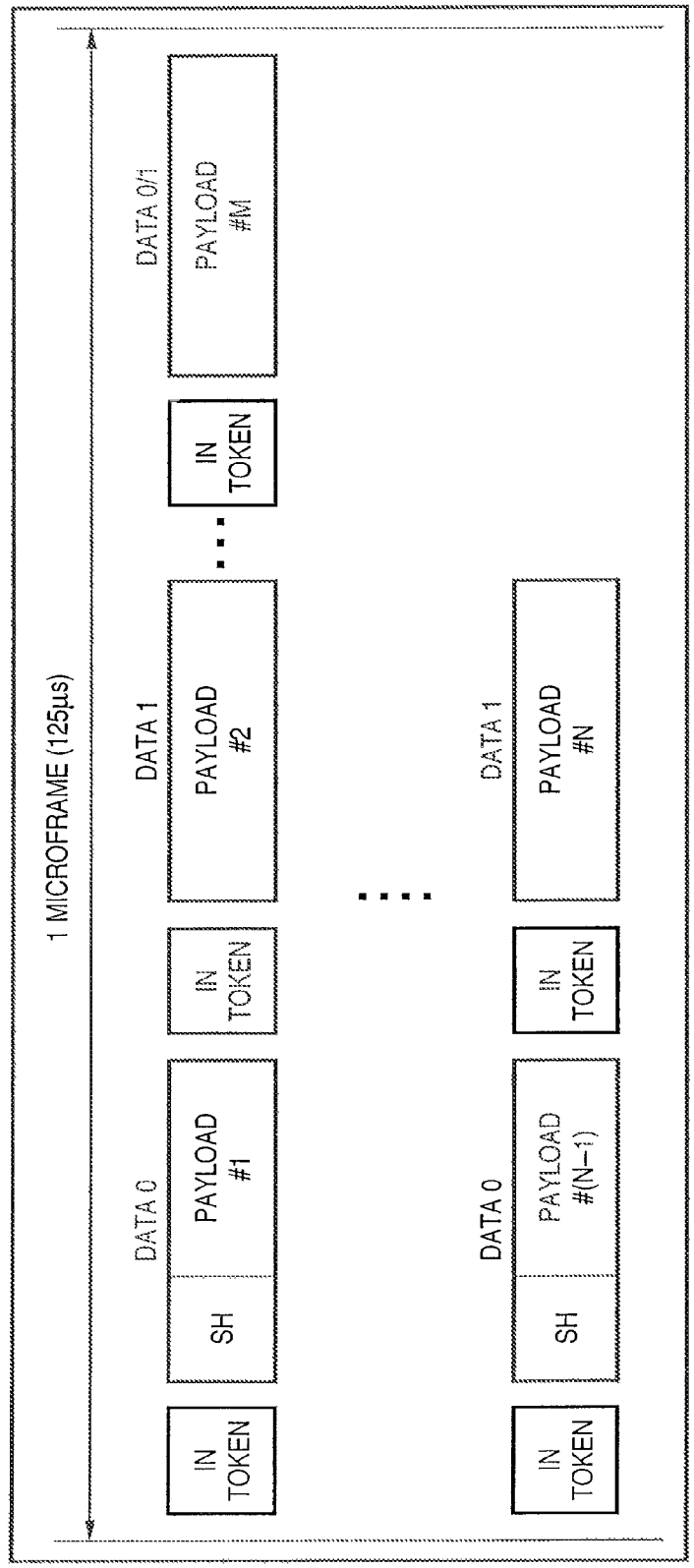
FIG. 8 is chart for explaining an example of a sequence for transferring an MPEG-4 SL stream using a Bulk IN Transaction of USB 2.0.

An example of the MPEG-4 SL stream format and sequence upon transferring the Mux packet using a Bulk IN Transaction of USB 2.0 will be described below with reference to FIG. 8. When a Bulk IN Transaction is used, the transmission direction of an MPEG-4 SL stream is a direction from the video processing apparatus 10 to the host 20. FIG. 8 will explain an example using High-speed mode of USB 2.0.

Referring to FIG. 8, an IN token is a transmission request packet of DATA0 or DATA1 from the video processing apparatus 10 to the host 20. DATA0 and DATA1 are data packets to be transferred from the video processing apparatus 10 to the host 20 in a Bulk Transfer mode. SH (stream header) is a header which is transmitted every microframe (125 micro-seconds), and payloads #1 to #N (N is an integer equal to or larger than 2, N>M) are data obtained from one Mux packet. Note that M is the number of payloads to be transferred within one microframe. That is, one Mux packet is made up of payloads #1 to #N. Note that M indicates the number of payloads to be transmitted per microframe.

The MPEG-4 SL stream with the format shown in FIG. 8 is generated for each Mux Packet, and is transmitted in turn. By repeating this process, the video processing apparatus 10 can transmit the MPEG-4 SL stream to the host 20. In the first embodiment, in order to identify switching of Mux packets based on the stream header (SH), data obtained from a plurality of Mux packets are prevented from being mixed in one microframe. That is, the video processing apparatus 10 starts transmission of the next Mux packet from the next microframe.

In this manner, according to the first embodiment, an MPEG-4 SL stream generated from an Mux packet can be transmitted using a Bulk IN Transaction of USB 2.0. In other words, one or a plurality of elementary streams complying with ISO/IEC 14496-1:1999 can be transmitted from the video processing apparatus 10 to the host 20 using Bulk Transfer of USB 2.0.

Figure 9:
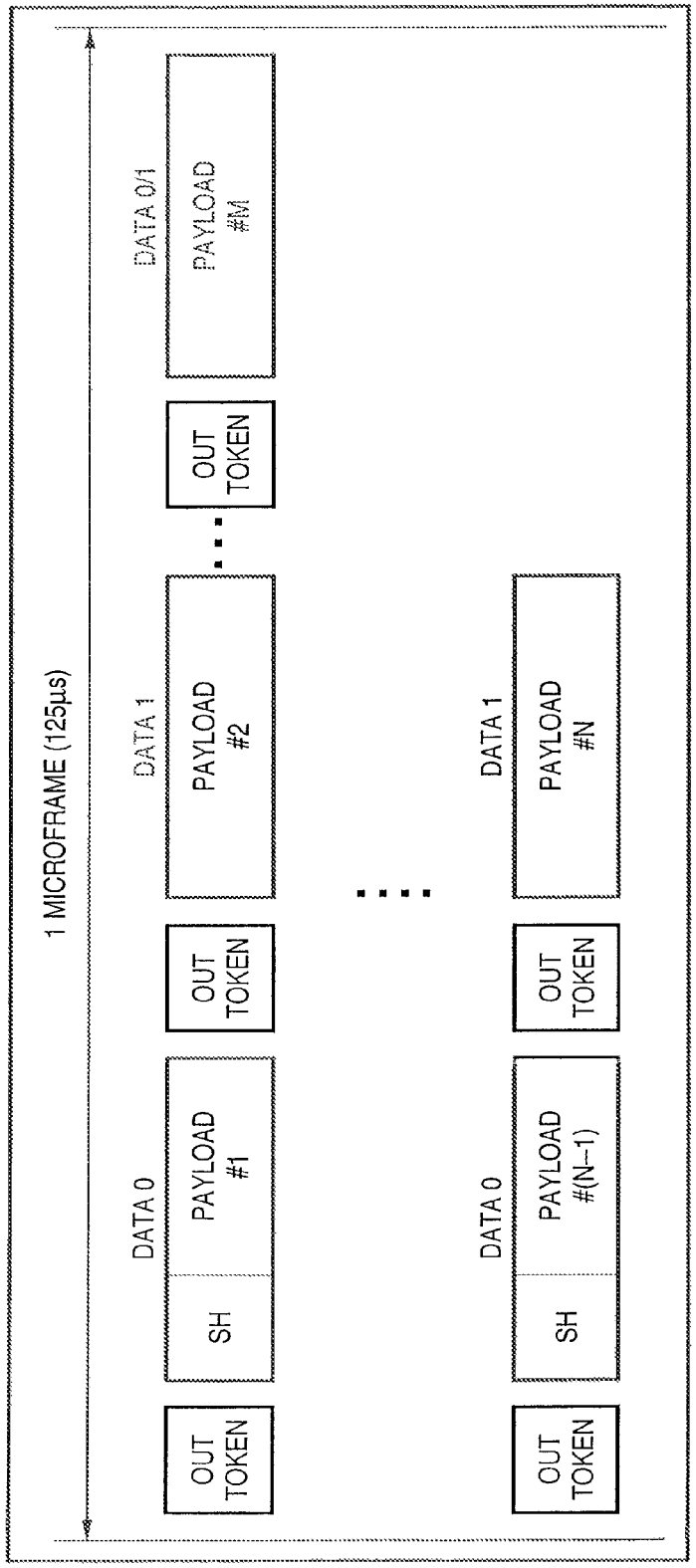
FIG. 9 is a chart for explaining an example of a sequence for transferring an MPEG-4 SL stream using a Bulk OUT Transaction of USB 2.0.

An example of the MPEG-4 SL stream format and sequence upon transferring the aforementioned Mux packet using a Bulk OUT Transaction of USB 2.0 will be described below with reference to FIG. 9. When a Bulk OUT Transaction is used, the transmission direction of an MPEG-4 SL stream is a direction from the host 20 to the video processing apparatus 10. FIG. 9 will explain an example using a High-speed mode of USB 2.0.

Referring to FIG. 9, OUT tokens are transmission request packets of DATA0 and DATA1 from the host 20 to the video processing apparatus 10. DATA0 and DATA1 are data packets to be transferred from the host 20 to the video processing apparatus 10 in the Bulk Transfer mode. SH (stream header) is a header which is transmitted every microframe (125 micro-seconds), and payloads #1 to #N (N is an integer equal to or larger than 2, N>M) are data obtained from one Mux packet. That is, one Mux packet is made up of payloads #1 to #N. Note that M indicates the number of payloads to be transmitted per microframe.

The MPEG-4 SL stream with the format shown in FIG. 9 is generated for each Mux Packet, and is transmitted in turn. By repeating this process, the host 20 can transmit the MPEG-4 SL stream to the video processing apparatus 10. In the first embodiment, in order to identify switching of Mux packets based on the stream header (SH), data obtained from a plurality of Mux packets are prevented from being mixed in one microframe. That is, the host 20 starts transmission of the next Mux packet from the next microframe.

In this manner, according to the communication system of the first embodiment, an Mux packet can be transmitted in the MPEG-4 SL stream format using a Bulk OUT Transaction of USB 2.0. In other words, one or a plurality of elementary streams complying with ISO/IEC 14496-1:1999 can be transmitted from the host 20 to the video processing apparatus 10 using a Bulk Transfer of USB 2.0.

An example of the format of the stream header will be described below with reference to FIG. 10. The stream header (SH) is a header transmitted every microframe (125 microseconds), as shown in FIGS. 6 to 9. Upon transmitting an MPEG-4 SL stream from the video processing apparatus 10 to the host 20, the video processing apparatus 10 generates each stream header. Upon transmitting an MPEG-4 SL stream from the host 20 to the video processing apparatus 10, the host 20 generates each stream header.

Figure 10:
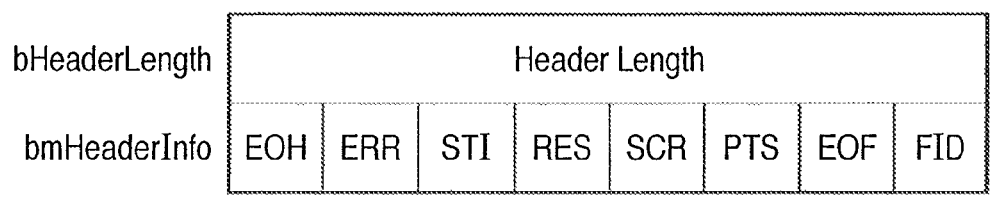
FIG. 10 is a view for explaining the format of a stream header.

Referring to FIG. 10, a bHeaderLength field (1 byte) stores a value indicating the data length (2 bytes) of the stream header. A bmHeaderinfo field (a variable length but 1 byte in the first embodiment) includes FID (Frame ID), an EOF (End of Frame), a PTS (Presentation Time Stamp), an SCR (Source Clock Reference), an RES (Reserved), an STI (Still Image), an ERR (Error bit), and an EOH (End of Header) fields. Note that the data length of each field in the bmHeaderinfo field is 1 bit.

Every time an Mux packet is switched, the FID field stores 0 or 1. That is, when the FID field of the immediately preceding Mux packet is 0 (or 1), that of the next Mux packet is 1 (or 0). When a payload to be transmitted after the stream header includes the last part of an Mux packet, the video processing apparatus 10 or host 20 stores 1 in the EOF field; otherwise, it stores 0 in the EOF field. The host 20 and the video processing apparatus 10 can detect switching of Mux packets by checking the contents of the FID and EOF fields.

The PTS stores presentation time stamp data, and the SCR field stores source clock reference fields. However, since the first embodiment does not use these fields, 0 is stored in these fields. Since the RES field is preserved for the future use, 0 is stored in the RES field.

If all payloads to be transmitted after the stream header include still image data, the STI field stores 1; otherwise, the STI field stores 0. If at least one of payloads to be transmitted after the stream header includes any error, 1 is stored in the ERR field; otherwise, 0 is stored in the ERR field. The EOH field stores a value (1) indicating the end of the stream header.

As can be seen from the above description, according to the first embodiment, the video processing apparatus 10 can transmit one or a plurality of elementary streams to the host 20 using an Isochronous or a Bulk Transfer of USB 2.0. Also, the host 20 can transmit one or a plurality of elementary streams to the video processing apparatus 10 using an Isochronous or a Bulk Transfer of USB 2.0.

According to the first embodiment, the video processing apparatus 10 can receive one or a plurality of elementary streams from the host 20 using an Isochronous or a Bulk Transfer of USB 2.0. Also, the host 20 can receive one or a plurality of elementary streams from the video processing apparatus 10 using an Isochronous or a Bulk Transfer of USB 2.0.

According to the first embodiment, since the video processing apparatus 10 can convert one or a plurality of elementary streams into a single data stream (i.e., an MPEG-4 SL stream) and can transmit that stream to the host 20, the number of end points of the video processing apparatus 10 can be reduced to one. In an example that transmits a plurality of elementary streams from independent end points, control among these end points is required. However, the first embodiment can obviate the need for such control.

According to the first embodiment, since the video processing apparatus 10 can restore a single data stream (i.e., an MPEG-4 SL stream) transmitted from the host 20 to one or a plurality of elementary streams, the number of end points of the video processing apparatus 10 can be reduced to one. In an example that transmits a plurality of elementary streams from independent end points, control among these end points is required. However, the first embodiment can obviate the need for such control.

According to the first embodiment, the video processing apparatus 10 can transfer a plurality of elementary streams with different data formats using a single data stream. As described above, the video processing apparatus 10 can transfer an elementary stream of visual data complying with ISO/IEC 14496-2:1999, and that of audio data complying with ISO/IEC 14496-3:1999 using one data stream, as described above. Furthermore, an elementary stream of a scene description complying with ISO/IEC 14496-1:1999 can be added to these elementary streams.

An example of the format of an MPEG-4 SL Stream Format Descriptor used in the first embodiment will be described below with reference to FIG. 11.

Referring to FIG. 11, a bNumPackets field is set with the number of packets which are sent by the MPEG-4 SL Stream Format Descriptor. This number is used as the number of elements of subsequent sequence data. A bPacketLength field indicates the byte length of packet data set in the next bPacket field. The bPacket field is set with an MPEG4_Mux packet of a stream to be transferred. A pair of bPacketLength and bPacket fields is used as an element of a sequence. Upon sending a plurality of packets, pairs of bPacketLength and bPacket fields, which describe data of respective packets, are successively described.

Note that the bPacketLength and bPacket fields are options. When there is no packet to be sent by the descriptor, 0 is set in the bNumPackets field to omit subsequent fields. In the MPEG-4 SL Stream Format Descriptor of the first embodiment, a sequence data structure used to set packets of a stream to be reliably transferred is defined.

The sequence data of packets set in the MPEG-4 SL Stream Format Descriptor of the first embodiment can be transmitted to the host 20 at the time of initialization or at an arbitrary timing after initialization.

As described above, the Error bit (ERR field) is defined in the stream header (SH) of the MPEG-4 SL stream. When some error has occurred in the video processing apparatus 10 as a device (for example, the data format of one elementary stream has changed), the video processing apparatus 10 sets 1 as the value of the ERR field of the stream header. When the data format of a data stream has changed, the video processing apparatus 10 stops transfer of a payload output from the digital interface unit 204, and transmits the stream header alone. On the other hand, when 1 is set in the ERR field of the stream header, the host 20 requests the video processing apparatus 10 to send stream error code control data to detect the cause of the error that has occurred in the video processing apparatus 10. FIG. 12 shows the structure of the stream error code control data.

The stream error code control data has a bStreamError-Code field. If the value of this field is other than 0, it indicates that a stream error has occurred upon transferring a video or still image. When such error has occurred, the video processing apparatus 10 as a device sets an appropriate value in the bStreamErrorCode field. In the first embodiment, when one of the following events has occurred, the host 20 must transmit a GET_CUR request that requests the stream error code control data so as to specify the cause of the error:

(1) when the device sets 1 in the Error bit (ERR field) of the stream header;

(2) when the device has issued a "Stream Error" interrupt signal; and (3) when a bulk video end point transmits a stall packet to the host 20 in the data or handshake stage of transaction.

MPEG-4 Systems data may be transferred as a stream on a USB pipe without using any descriptor. Normally, MPEG-4 Systems data is basically transferred as a stream by a highly reliable method such as a Bulk Transfer. Also, MPEG-4 Systems data may be transferred as a stream using an Isochronous communications. The first embodiment will not touch any recovery process upon the occurrence of a transmission error in an Isochronous Transfer, but a recovery process that periodically resends MPEG-4 Systems data may be made as needed.

In the first embodiment, for example, the MPEG-4 SL Stream Format Descriptor uses property information of an MPEG-4 SL data stream. In the video processing apparatus 10, terminals corresponding to the USB IN and the OUT end points and interfaces to which these terminals belong support a Format Descriptor corresponding to one or more formats. Upon selecting a format, host software sends a control request to a corresponding interface. In an MPEG-4 SL payload, a Frame Descriptor to be appended need not be defined.

In MPEG-4 Systems, an initial object descriptor that indicates an initial stream configuration must be transmitted first. To this end, the transmitting side (video processing apparatus 10) of a stream sets the initial object descriptor in a bInitialObjectDescriptor field of the MPEG-4 SL Stream Format Descriptor and sends it upon initialization. In the first embodiment, the contents of data to be set in the initial object descriptor are arbitrary as long as they follow the specification of ISO/IEC 14496-1:1999. However, the following data are normally set:

profile_and_level_indication
ES_Descriptor
DecoderConfigDescriptor
DecoderSpecificInfo (data contents vary depending on the encoding format of a stream; in case of MPEG-4 Visual, Visual Object Sequence data is set)
SLConfigDescriptor (used to interpret the layout of an SL packet header)

Normally, the initial object descriptor is sent only once in the initialization process upon selection of an MPEG-4 SL Payload Format, but it is not sent twice or more. When the initial object descriptor is resent after completion of initialization, the receiving side executes an initialization process again according to the contents of the resent initial object descriptor. MPEG-4 Systems streams such as OD, BIFS, and the like defined by ISO/IEC 14496-1:1999 above are normally transmitted by a method which is free from any data losses due to transmission errors. In the first embodiment, such a data stream can be reliably transferred by setting it in the MPEG-4 SL Stream Format Descriptor.

In the first embodiment, the bInitialObjectDescriptor field is an option, and may be omitted. In this case, the video processing apparatus 10 can initialize a stream using default properties without any initial object descriptor.

Second Embodiment

The first embodiment has exemplified transmission/reception of the MPEG-4 SL stream using a High-speed mode of USB 2.0 with reference to FIGS. 6 to 9. However, the present invention is not limited to such specific embodiment. The first embodiment may be modified to an embodiment that transmits/receives the MPEG-4 SL stream using a full-speed mode of USB 2.0. In this case, the aforementioned stream header is transmitted, e.g., every USB frame (1 ms). If a transfer mode faster than a High-speed mode is specified in the future, the first embodiment may be modified to an embodiment that transmits/receives the MPEG-4 SL stream using such transfer mode.

Third Embodiment

The present invention is not limited to embodiments that uses existing USB 2.0. The present invention can be applied to, e.g., an embodiment that uses a communication system complying with the extended standard of USB 2.0, an embodiment that uses a communication system complying with the standard which specifies functions equivalent to USB 2.0, and the like.

Fourth Embodiment

The present invention is not limited to an embodiment that uses elementary streams complying with existing ISO/IEC 14496-1:1999. The present invention can be applied to, e.g., an embodiment that uses elementary streams complying with an extended standard of ISO/IEC 14496-1:1999, an embodiment that uses elementary streams complying with a standard which specifies functions equivalent to ISO/IEC 14496-1:1999, and the like.

Other Embodiments

The present invention can be implemented not only in the above embodiments but also in other embodiments. For example, the present invention can be implemented by a program that can be executed by a computer and, in such case, the program itself forms the present invention. As a storage medium that supplies the program, a ROM, a Floppy® disk, a hard disk, an optical disk, a magnetooptical disk, a CD-ROM, a CD-R, magnetic tape, a nonvolatile memory card, and the like may be used.

According to the present invention, one or a plurality of elementary streams complying with ISO/IEC 14496-1:1999 can be transmitted to another apparatus (host or the like) using an Isochronous or a Bulk Transfer of USB 2.0.

Also, according to the present invention, one or a plurality of elementary streams complying with ISO/IEC 14496-1:1999 can be received from another apparatus (host or the like) using an Isochronous or a Bulk Transfer of USB 2.0.

As many apparently widely different embodiments of the present invention can be made without departing from the spirit and scope thereof, it is to be understood that the invention is not limited to the specific embodiments thereof except as defined in the appended claims.

The invention claimed is:

1. A data stream transmitting apparatus comprising:
    an SL packet generating unit that generates synchronization layer (SL) packets from elementary streams;
    a multiplexed packet generating unit that generates multiplexed packets from the SL packets, wherein each of the multiplexed packets includes (a) one of the SL packets and (b) an elementary stream identifier that identifies one of the elementary streams to which said one of the SL packets belongs, each of the multiplexed packets comprises a header section and a payload section, the elementary stream identifier is stored in the header section of the multiplexed packet, and said one of the SL packets is stored in the payload section of the multiplexed packet;
    a data stream generating unit that generates a data stream from the multiplexed packets; and
    a transmission unit configured to transmit the data stream to an external device.

2. The data stream transmitting apparatus according to claim 1, wherein the transmission unit is configured to transmit the data stream to the external device using an isochronous transfer.

3. The data stream transmitting apparatus according to claim 1, wherein the isochronous transfer complies with USB 2.0.

4. The data stream transmitting apparatus according to claim 1, wherein the transmission unit is configured to transmit the data stream to the external device using a bulk transfer.

5. The data stream transmitting apparatus according to claim 4, wherein the bulk transfer complies with USB 2.0.

6. The data stream transmitting apparatus according to claim 1, wherein the transmission unit is configured to transmit a stream header to the external device, the stream header including (a) first information which is changed when the multiplexed packet is changed to another multiplexed packet and (b) second information for detecting a last part of the multiplexed packet included in the data stream.

7. The data stream transmitting apparatus according to claim 1, wherein each of the multiplexed packets includes no more than one SL packet.

8. The data stream transmitting apparatus according to claim 1, wherein prior to transmitting the data stream to the external device, the transmission unit transmits, to the external device, an initial object descriptor, and
    wherein the initial object descriptor indicates an initial stream configuration and is stored in a field of an MPEG-4 SL stream format descriptor.

9. The data stream transmitting apparatus according to claim 8, wherein the initial object descriptor comprises an elementary stream descriptor and an SL configuration descriptor.

10. The data stream transmitting apparatus according to claim 1, wherein the elementary streams comply with ISO/IEC 14496-1:1999.

11. The data stream transmitting apparatus according to claim 1, wherein the multiplexed packets are different than FlexMux packets defined by ISO/IEC 14496-1:1999, and wherein the elementary stream identifier is an ES_ID identifier defined by ISO/IEC 14496-1:1999.

12. A method of controlling a data stream transmitting apparatus, comprising:
    generating synchronization layer (SL) packets from elementary streams;
    generating multiplexed packets from the SL packets, wherein each of the multiplexed packets includes (a) one of the SL packets and (b) an elementary stream identifier that identifies one of the elementary streams to which said one of the SL packets belongs, each of the multiplexed packets comprises a header section and a payload section, the elementary stream identifier is stored in the header section of the multiplexed packet, and said one of the SL packets is stored in the payload section of the multiplexed packet;
    generating a data stream from the multiplexed packets; and
    transmitting the data stream to an external device.

13. The method according to claim 12, wherein the data stream is transmitted to the external device using an isochronous transfer.

14. The method according to claim 13, wherein the isochronous transfer complies with USB 2.0.

15. The method according to claim 12, wherein the data stream is transmitted to the external device using a bulk transfer.

16. The method according to claim 15, wherein the bulk transfer complies with USB 2.0.

17. The method according to claim 12, further comprising transmitting a stream header to the external device, the stream header including (a) first information which is changed when the multiplexed packet is changed to another multiplexed packet and (b) second information for detecting a last part of the multiplexed packet included in the data stream.

18. The method according to claim 12, wherein the elementary streams comply with ISO/IEC 14496-1:1999.

19. The method according to claim 12, wherein the multiplexed packets are different than FlexMux packets defined by ISO/IEC 14496-1:1999, and wherein the elementary stream identifier is an ES_ID identifier defined by ISO/IEC 14496-1:1999.

20. A data stream receiving apparatus comprising:
    a reception unit configured to receive a data stream from an external device, wherein the data stream is generated from multiplexed packets, the multiplexed packets are generated from synchronization layer (SL) packets, the SL packets are generated from elementary streams, each of the multiplexed packets includes (a) one of the SL packets and (b) an elementary stream identifier that identifies one of the elementary streams to which said one of the SL packets belongs, each of the multiplexed packets comprises a header section and a payload section, the elementary stream identifier is extracted from the header section of the multiplexed packet, and said one of the SL packets is extracted from the payload section of the multiplexed packet; and a restoration unit that restores, based on a plurality of the elementary stream identifiers extracted from the multiplexed packets, the SL packets extracted from the multiplexed packets to the elementary streams.

21. The data stream receiving apparatus according to claim 20, wherein the reception unit is configured to receive the data stream transmitted from the external device using an isochronous transfer.

22. The data stream receiving apparatus according to claim 21, wherein the isochronous transfer complies with USB 2.0.

23. The data stream receiving apparatus according to claim 20, wherein the reception unit is configured to receive the data stream transmitted from the external device using a bulk transfer.

24. The data stream receiving apparatus according to claim 23, wherein the bulk transfer complies with USB 2.0.

25. The data stream receiving apparatus according to claim 20, wherein the reception unit is configured to receive a stream header from the external device, the stream header including (a) first information which is changed when the multiplexed packet is changed to another multiplexed packet and (b) second information for detecting a last part of the multiplexed packet included in the data stream.

26. The data stream receiving apparatus according to claim 20, wherein the elementary streams comply with ISO/IEC 14496-1:1999.

27. The data stream receiving apparatus according to claim 20, wherein the multiplexed packets are different than FlexMux packets defined by ISO/IEC 14496-1:1999, and wherein the elementary stream identifier is an ES_ID identifier defined by ISO/IEC 14496-1:1999.

28. A method of controlling a data stream receiving apparatus, comprising:

receiving a data stream from an external device, wherein the data stream is generated from multiplexed packets, the multiplexed packets are generated from synchronization layer (SL) packets, the SL packets are generated from elementary streams, each of the multiplexed packets includes (a) one of the SL packets and (b) an elementary stream identifier that identifies one of the elementary streams to which said one of the SL packets belongs, each of the multiplexed packets comprises a header section and a payload section, the elementary stream identifier is extracted from the header section of the multiplexed packet, and said one of the SL packets is extracted from the payload section of the multiplexed packet; and restoring, based on a plurality of the elementary stream identifiers extracted from the multiplexed packets, the SL packets extracted from the multiplexed packets to the elementary streams.

29. The method according to claim 28, wherein the data stream is transmitted from the external device using an isochronous transfer.

30. The method according to claim 29, wherein the isochronous transfer complies with USB 2.0.

31. The method according to claim 28, wherein the data stream is transmitted from the external device using a bulk transfer.

32. The method according to claim 31, wherein the bulk transfer complies with USB 2.0.

33. The method according to claim 28, further comprising receiving a stream header from the external device, the stream header including (a) first information which is changed when the multiplexed packet is changed to another multiplexed packet and (b) second information for detecting a last part of the multiplexed packet included in the data stream.

34. The method according to claim 28, wherein the elementary streams comply with ISO/IEC 14496-1:1999.

35. The method according to claim 28, wherein the multiplexed packets are different than FlexMux packets defined by ISO/IEC 14496-1:1999, and wherein the elementary stream identifier is an ES_ID identifier defined by ISO/IEC 14496-1:1999.

\* \* \* \* \*